UNITED STATES PATENT OFFICE.

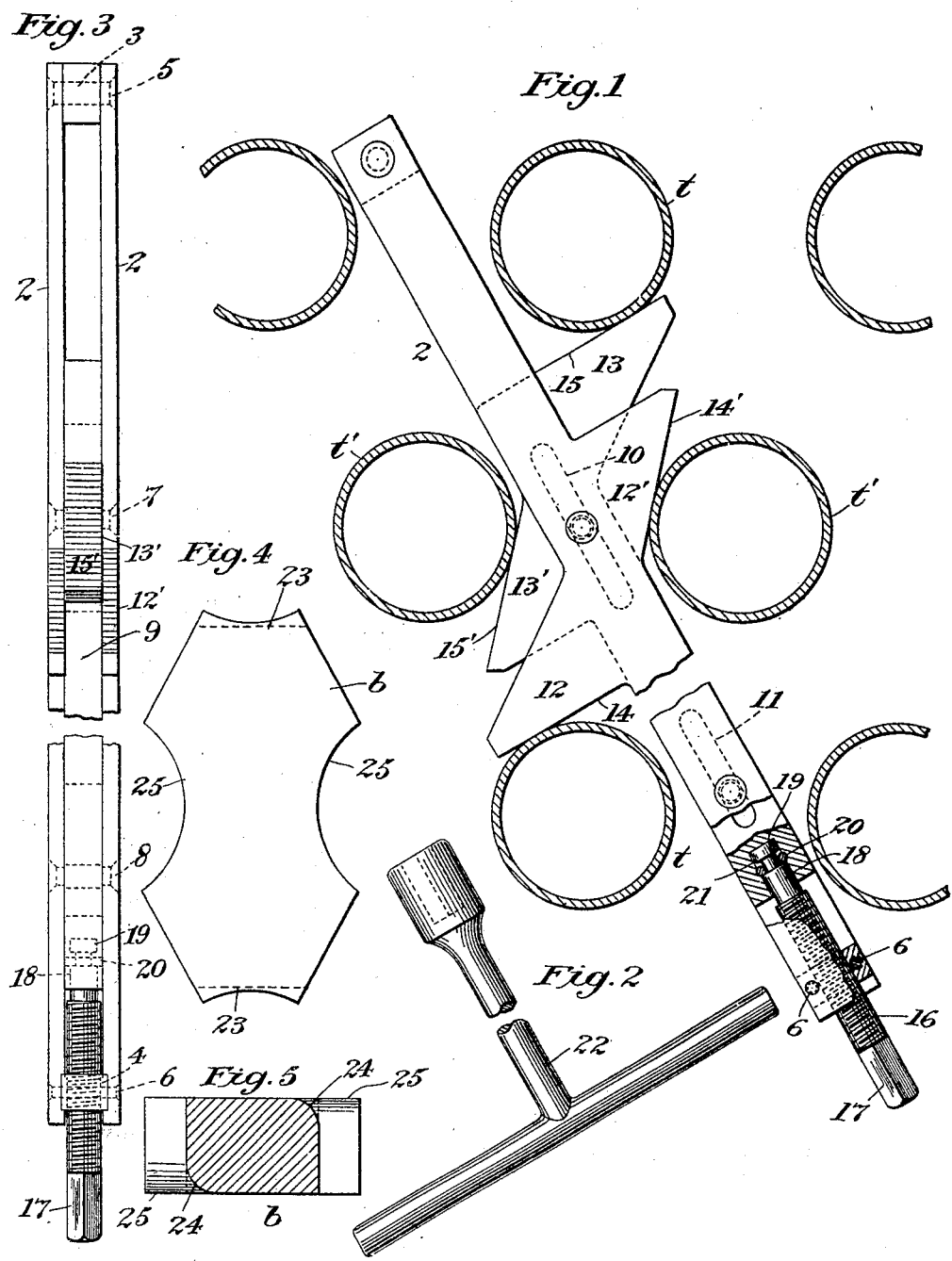

PATRICK HEELY AND JOHN KEERS, OF NEW YORK, N. Y.

TOOL FOR SPREADING THE TUBES OF WATER-TUBE BOILERS.

No. 808,920.  Specification of Letters Patent.  Patented Jan. 2, 1906.

Application filed July 7, 1905. Serial No. 268,723.

*To all whom it may concern:*

Be it known that we, PATRICK HEELY and JOHN KEERS, citizens of the United States, and residents of Brooklyn, in the county of Kings and State of New York, have invented certain new and useful Improvements in Tools for Spreading the Tubes of Water-Tube Boilers, &c., of which the following is a specification.

This invention relates to a tool for spreading the tubes of water-tube boilers; and its main object is to provide a tool by means of which such tubes may be spread with precision to an extent necessary in any particular case for the insertion or removal of a fire-brick between the tubes so spread.

As is well known, the tubes of water-tube boilers pass through baffle-plates which are protected from the direct action of the intense heat of the furnace by fire-bricks of very refractory material, these fire-bricks being so shaped as to fill the spaces between the water-tubes and being generally identical in contour and constructed to fill a substantially diamond-shaped space between four adjacent water-tubes and lying in close contact with adjacent fire-bricks filling other similar spaces. In water-tube boilers there is a large number of such fire-bricks, and it is a difficult matter to locate them in position or remove them after they are once in place, and, so far as applicants are aware, no special tool has been heretofore devised for this purpose, and there is no means in use for accomplishing this result. In order to insert or remove a fire-brick, it is necessary first to expand the water-tubes at a point somewhat in advance of the position occupied or to be occupied by the fire-brick and afterward so to manipulate the fire-brick as to enter it between the tubes at the point where they are spread and then move it into contact with the baffle-plate by forcing it along between the water-tubes or, in case it is partly broken, to dislodge it or break it out or move it along toward the point where the tubes are spread and then withdraw it at the point where the tubes are so spread.

Our present invention relates to a tool for spreading the water-tubes at a suitable point in advance of the baffle-plate, and particularly to a tool for both spreading the tubes and holding them in their spread positions while a fire-brick is being inserted or removed.

In a companion application, filed July 7, 1905, Serial No. 268,724, we have disclosed a tool for holding and inserting or removing a fire-brick after the water-tubes have been properly spread, the present application being restricted to the tool for spreading the tubes.

In inserting fire-bricks in the ordinary manner without the use of a special tool for spreading the water-tubes it has been found extremely difficult to spread the tubes to a sufficient extent and maintain them in their spread positions. Because of this it has usually been necessary to cut away portions of the edges of the fire-bricks in order to reduce their size sufficiently to permit the insertion of the same edgewise between the water-tubes and subsequent turning of the fire-bricks into their proper positions in parallelism with the baffle-plate. This cutting operation is always a difficult one to perform without spoiling or breaking the fire-brick. It always weakens the brick, which is then more liable to be broken, and the removal of the portions of the edges results in leaving portions of the baffle-plate uncovered, and hence unprotected from the intense heat of the furnace.

By means of our improved tool for spreading the tubes between which the fire-bricks are to be inserted the insertion of fire-bricks of full size is permitted, and an important object of this invention is therefore to provide means for permitting the insertion of such bricks which will render it unnecessary to cut the fire-brick, and thereby weaken the same and leave portions of the baffle-plate unprotected.

In the drawings accompanying this specification and forming part of the present application, Figure 1 is an elevation, partly in section, of our tube-spreading tool in operative relation with a plurality of tubes to be spread. Fig. 2 is a detail of a handle for effecting adjustments of the tube-spreading members of the tool. Fig. 3 is an edge elevation of the tube-spreading tool. Fig. 4 is a side elevation of a fire-brick, showing the extent to which the ends of the same are usually cut before the fire-brick is inserted in place. Fig. 5 is a transverse section of the same, showing the extent to which the side edges of a fire-brick are usually cut and rounded off before the fire-brick is inserted between the tubes.

Similar characters designate like parts in all the figures of the drawings.

The principal elements of our tool for spreading the tubes of water-tube boilers are a carrier and two or more tube-spreading members movable away from and toward each other for the purpose of effecting a corresponding spreading of two or more tubes or the release of such tubes after the same have been spread. In the preferred construction there will be two pairs of these tube-spreading members and means for moving the members of one pair in one direction to spread one pair of tubes and for moving the other pair of members in a direction transverse to the first for the purpose of spreading another pair of tubes. The carrier which supports the tube-spreading members will preferably consist of two main parts, one of which carries one or more tube-spreading members and the other of which is movable relatively to the first part of the carrier and also supports one or more tube-spreading members.

The particular construction of the two parts of the carrier may be varied considerably. In the construction shown the main or fixed member of the carrier is designated generally by 2 and consists of a pair of side bars of metal held together and spaced apart by suitable connections and spacing-pieces. The spacing-pieces are located near opposite ends of the main part 2 of the carrier and consist of a block 3 and a fixed nut 4, the former of which is held in place by a rivet 5 and the latter by a pair of rivets 6. At suitable intermediate points the side bars of the fixed member 2 are also connected in this case by spacing-studs 7 and 8, which are headed up and riveted and serve to space the bars of the fixed part 2 at points between the ends of the tool. This fixed member of the tool constitutes a guide on which the movable member will preferably slide.

In the present construction the movable member of the tube-spreading tool is a bar 9 of sufficient thickness to fill the space between the side bars of the fixed part 2 of the carrier. This movable part 9 constitutes a slide which is guided on the main part 2 by the spacing portions of the studs 7 and 8, guide-walls 10 and 11 being cut in the movable part 9 of the carrier for the purpose of permitting movement thereof lengthwise of the fixed part 2.

The tube-spreading members are preferably arranged in pairs, one member of each pair being carried by the fixed part of the carrier and the other member of each pair by the movable part 9 of the carrier. The tube-spreading members shown in this case are strong substantially triangular pieces integral with and extending in the planes of the respective side bars of the fixed part 2 of the carrier and movable part 9 thereof. At least four such tube-spreading members will preferably be employed, two of which will be integral with the fixed part of the carrier and the other two of which will be integral with the movable part of the carrier. As the fixed part of the carrier consists of two main members or side bars, it is convenient to have four of these tube-spreading members integral therewith, two such members being disposed in corresponding positions crosswise of the fixed member of the carrier at one point in the length thereof and the other two also occupying similar positions crosswise of the fixed part of the carrier at another point in the length of the tool. The tube-spreading members of one of these pairs are designated by 12 and the tube-spreading members of the other pair by 12'. The tube-spreading members 12 of the fixed part 2 of the carrier coöperate with a corresponding tube-spreading member 13 on the movable part 9 of the carrier, and the tube-spreading members 12' on the fixed part 2 of the carrier coöperate with a corresponding tube-spreading member 13' on said movable part 9. The members 12 and 13 and 12' and 13' are disposed at opposite sides of the respective parts with which they are connected. The working faces of the parts 12 and 13 are designated, respectively, by 14 and 15, and the working faces of the parts 12' and 13' are designated, respectively, by 14' and 15'. The working faces 14 and 15 coöperate to spread a pair of tubes in different horizontal rows, as seen in Fig. 1, while the working faces 14' and 15' serve to spread two tubes in a row intermediate of those in which the tubes are located that are spread by the faces 14 and 15. The working faces 14 and 15 are here substantially at a right angle to the longitudinal axis of the part 2 of the carrier, while the working faces 14' and 15' are at an acute angle thereto. When the movable part or slide 9 of the carrier is moved upward along the fixed part or guide 2 of said carrier, the working faces 14 and 15 will spread the tubes $t$ in a direction substantially vertical to the rows of tubes, and at the same time the working faces 14' and 15' will spread the tubes $t'$ in a substantially horizontal direction. Before these parts are thus spread the tool should be inserted edgewise between the tubes either from below or above the bank of tubes and then turned to the position shown in Fig. 1, after which the spreading of the tubes by moving the member 9 upward, as shown in Fig. 1, may be begun.

In order to spread the tubes $t$ and $t'$ most advantageously, we prefer to connect the two parts of the carrier by screw-threads, the fixed nut 4 constituting the threaded element of the fixed part 2 of the carrier, while a screw, such as as 16, having a swiveled connection with the movable part 9 of the carrier, is preferably the element which coöperates with said fixed nut. The screw shown has a squared head 17, a threaded shank of considerable length screwed into and adapted to be adjusted in the nut 4, and a journal 18, peripherally grooved, as at 19, to receive a pair of pins 20, which pass through the movable part 9 of the carrier and serve to prevent longitudinal movement of the screw 16 with respect to the part 9, while permitting turning of the screw in the bore 21 at the end of the part 9. It will be obvious that when this screw 16 is turned in one or the other direction the tube-spreading members 13 and 13' will be moved lengthwise of the tool, and, moreover, that they will be held positively in any position to which they may be adjusted. Hence when the tubes $t$ and $t'$ are spread to the desired extent the working faces 14 and 15 and 14' and 15' of the tube-spreading members serve to maintain the tubes in such spread positions until the fire-brick is inserted in place or removed, as by means of the tool shown and described in our companion application. The adjusting-screw 16 may be turned in any suitable manner—as, for example, by means of a handle in the form of a T-wrench 22.

When tubes of water-tube boilers and other apparatus are spread in the manner just described, the cutting of the fire-bricks as heretofore practiced is rendered unnecessary, because the tubes when spread are sufficiently far apart to admit the full-sized approximately diamond-shaped fire-brick between them. Because of this the full strength of the fire-brick as it comes from the manufacturer is retained. One of these fire-bricks is illustrated at $b$ in Figs. 4 and 5. The dotted lines 23 show the extent to which the ends of the fire-brick usually have to be cut away. The full lines 24 in Fig. 5 show the extent to which the edges 25 of an ordinary fire-brick usually have to be cut away and rounded before they can be inserted, the dotted lines showing the normal lines of the fire-brick as it is made.

What we claim is—

1. A tool for spreading the tubes of water-tube boilers, embodying a carrier, a pair of tube-spreading members for spreading a plurality of tubes relatively to one another, and means for moving said tube-spreading members toward and from each other.

2. A tool for spreading the tubes of water-tube boilers, embodying a carrier, a pair of tube-spreading members for spreading a plurality of tubes relatively to one another, said tube-spreading members having parallel working faces, and means for moving said tube-spreading members toward and from each other and maintaining said working faces in parallelism.

3. A tool for spreading the tubes of water-tube boilers, embodying a carrier, a pair of tube-spreading members for spreading a plurality of tubes relatively to one another, and means for moving said tube-spreading members toward and from each other and for holding them in any position to which they may be shifted.

4. A tool for spreading the tubes of water-tube boilers, embodying a two-part carrier the two parts of which are adjustable relatively to each other, and a pair of tube-spreading members for spreading a plurality of tubes relatively to one another, said tube-spreading members being secured respectively to the two parts of the carrier.

5. A tool for spreading the tubes of water-tube boilers, embodying a two-part carrier the two parts of which are connected by screw-threads and are adjustable thereby relatively to each other, and a pair of tube-spreading members for spreading a plurality of tubes relatively to one another, said tube-spreading members being secured respectively to the two parts of the carrier and movable toward and from each other.

6. A tool for spreading the tubes of water-tube boilers, embodying a two-part carrier the two parts of which are connected by screw-threads and are adjustable thereby relatively to each other, and a pair of tube-spreading members for spreading a plurality of tubes relatively to one another, said tube-spreading members being secured respectively to the two parts of the carrier and movable toward and from each other and having parallel working faces.

7. A tool for spreading the tubes of water-tube boilers, embodying a two-part carrier forming a rod one part of which constitutes a guide and the other part a slide movable along said guide, means for adjusting said slide on said guide and for holding it in its adjusted position, and a pair of tube-spreading members secured respectively to the two parts of the carrier.

8. A tool for spreading the tubes of water-tube boilers, embodying a two-part carrier forming a rod one part of which constitutes a guide and the other part a slide movable along said guide, means for adjusting said slide on said guide and for holding it in its adjusted position, and a pair of tube-spreading members secured respectively to the two parts of the carrier and having working faces extending in parallelism and at an acute angle to the axis of the carrier.

9. A tool for spreading the tubes of water-tube boilers, embodying a carrier having more than two tube-spreading members, and means for moving said tube-spreading members away from and toward each other to spread and release more than two tubes.

10. A tool for spreading the tubes of water-tube boilers, embodying a carrier, two pairs of tube-spreading members, and means for moving the members of one pair away from and toward each other in one direction and for moving the members of the other pair away from and toward each other in a direction transverse thereto to spread and release two pairs of tubes.

11. A tool for spreading the tubes of water-tube boilers, embodying a carrier, two pairs of tube-spreading members the working faces of each pair being parallel, and means for moving the members of one pair away from and toward each other in one direction and for moving the members of the other pair away from and toward each other in a direction transverse thereto to spread and release two pairs of tubes.

12. A tool for spreading the tubes of water-tube boilers, embodying a rod-like carrier, two pairs of tube-spreading members the working faces of each pair being parallel and the working faces of one pair being disposed at an acute angle to the axis of the carrier, and means for moving the members of one pair away from and toward each other in the direction of the length of the carrier and for moving the members of the other pair away from and toward each other in a direction transverse thereto to spread and release two pairs of tubes.

13. A tool for spreading the tubes of water-tube boilers, embodying a two-part carrier the two parts of which are adjustable relatively to each other, and two pairs of tube-spreading members one member of each pair being secured to one part of the carrier and the other member of each pair being secured to the other part of the carrier and the working faces of members of different pairs being disposed at different angles.

14. A tool for spreading the tubes of water-tube boilers, embodying a two-part carrier the two parts of which are adjustable relatively to each other, and two pairs of tube-spreading members one member of each pair being secured to one part of the carrier and the other member of each pair being secured to the other part of the carrier and the members of one pair having parallel working faces disposed substantially at a right angle to the carrier and the members of the other pair having parallel working faces disposed substantially at an acute angle to the carrier.

15. A tool for spreading the tubes of water-tube boilers, embodying a two-part carrier the two parts of which are connected by screw-threads and are adjustable thereby relatively to each other, two pairs of tube-spreading members one member of each pair being secured to one part of the carrier and the other member of each pair being secured to the other part of the carrier and the working faces of members of different pairs being disposed at different angles.

16. A tool for spreading the tubes of water-tube boilers, embodying a two-part carrier one part of which has a fixed nut and the other part of which is slidable along the first, an adjusting-screw working in said nut of the first part of the carrier and swiveled to the other part of said carrier, and a pair of tube-spreading members secured respectively to the two parts of the carrier and movable toward and from each other.

17. A tool for spreading the tubes of water-tube boilers, embodying a two-part carrier one part of which has a fixed nut and the other part of which is slidable along the first, an adjusting-screw working in said nut of the first part of the carrier and swiveled to the other part of said carrier, and two pairs of tube-spreading members one member of each pair being secured to one part of the carrier and the other member of each pair being secured to the other part of the carrier and the working faces of members of different pairs being disposed at different angles.

Signed at Brooklyn, in the county of Kings and State of New York, this 23d day of June, A. D. 1905.

PATRICK HEELY.
    JOHN KEERS.

Witnesses:
 ROBERT H. MACFARLANE,
 ROBERT CHAMPION.